United States Patent Office 3,075,875
Patented Jan. 29, 1963

3,075,875
METHOD FOR CONTROLLING PLANT-PARASITIC NEMATODES
Alfred Margot, Basel, Switzerland, assignor to J. R. Geigy A.-G., Basel, Switzerland
No Drawing. Filed Sept. 23, 1960, Ser. No. 57,888
Claims priority, application Switzerland Sept. 24, 1959
7 Claims. (Cl. 167—30)

The present invention is concerned with new agricultural compositions for controlling plant-parasitic nematodes, containing substituted dithiocarbamic acid benzyl esters as active ingredients, and the use of these active ingredients and of the compositions containing them in a process of controlling plant-parasitic nematodes in a soil infested with such nematodes.

Up to the present, only those active substances for controlling plant-parasitic nematodes have attained practical importance which act either on the gas phase such as, e.g. 1,2-dibromo-3-chloropropene and mixtures of dichloropropane and dichloropropene, or those which quickly decompose in the earth such as e.g. the sodium salt of monomethyldithiocarbamic acid or 3,5-dimethyltetrahydro-1,3,5-thiadiazine-2-thione.

The first group of active substances has the disadvantage that they have to be applied by injection into the soil which is therefore, laborious and costly. The second group of active substances is not only instable after application, but also on previous storing and some of them can only be stored as an aqueous solution of a definite concentration. In addition, because of their irritant action and their bad smell, for example in green-houses or near living quarters, it is barely possible to use such agents.

It has now been found that substituted dithiocarbamic acid benzyl esters of the general Formula I

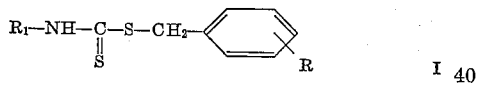

wherein
R represents a member selected from the group consisting of hydrogen, the chlorine atom, the methyl radical and the nitro group, and
$R_1$ represents a member selected from the group consisting of the methyl and the ethyl radical,
are excellently suitable as active ingredients for controlling plant-parasitic nematodes and, in addition, are free from the disadvantages mentioned above.

Some of the compounds of the general Formula I are known, those which are new can be easily produced by methods known per se, for example, by reacting salts of monoalkyl-dithiocarbamic acids with possibly correspondingly substittued benzyl halides; they are generally crystalline. The following compounds for example are suitable as nematocidal active ingredients:

N-methyl-dithiocarbamic acid benzyl ester, M.P. 49–51° C.,
N-methyl-dithiocarbamic acid-4-methylbenzyl ester, M.P. 94–95° C.,
N-methyl-dithiocarbamic acid-4-chlorobenzyl ester, M.P. 74–76° C.,
N-methyl-dithiocarbamic acid-4-nitrobenzyl ester, M.P. 88° C.,
N-methyl-dithiocarbamic acid-2-nitrobenzyl ester (no clear M.P.),
N-methyl-dithiocarbamic acid-benzyl ester, oil.

The compositions according to the invention for controling nematodes can be emulsions, suspensions, dusts, sprinking agents or solutions. The form of agent used depends on the intended application thereof which, in its turn, depends especially on the type of nematodes to be controlled, the plants to be protected, the climate and soil conditions as well as on the application technicalities. As even as possibile a distribution of the active substances throughout a layer of earth about 15–25 cm. deep is even as possible a distribution of the active substances required in this case being generally about 50–250 kg. per hectare. It is also possible, however, to make a particular application, for example, one limited to dibber holes or furrows and, sometimes, even a sufficient protective action is attained with a reduced amount of active substance.

Dusts and sprinkling agents are suitable in particular to fallow land before or at the same time as harrowing or mechanically preparing the ground, which process enables the agents to be finely distributed in the top earth layer. This mechanical process can be one ordinarily performed in the cultivation of the plant or it can be performed especially to distribute the agents, possibly together with synthetic fertilisers or soil conditioning agents. In addition, the agents can also be dusted or sprinkled, for example, in furrows in seed beds or inbetween growing plants.

Dusts can be produced on the one hand by mixing or milling together the active substance with a solid, pulverulent carrier which is insoluble in or difficulty soluble in water. As such can be used, e.g. talcum, diatomaceous earth, kieselguhr, kaolin, bentonite, calcium carbonate, boric acid or tricalcium phosphate. On the other hand, the substances can be drawn on to the carriers by means of a volatile solvent. To produce sprinkling agents, either coarsely granulated and/or specifically heavy carriers such as, e.g. coarsely ground limestone or sand can be used, or also mixtures of active substances with possibly porous carriers which themselves are finely granulated, can be granulated.

In addition, sprinkling agents can contain as carriers in coarsely granulated form or even in larger granules, solid substances which are more soluble in water and citric acid, for example, synthetic fertilisers such as calcium phosphates which have been made water soluble or other calcium, potassium or ammonium salts, phosphates or nitrates.

Emulsions according to the invention can be used both on fallow ground as well as, because of their penetration power, in existing cultivations. They can be produced by emulsifying the active substances as such or after dissolving them in organic solvents such as, e.g. xylene, in water which contains a capillary active substance. For the application of emulsions, in practice it is generally advantageous first to produce concentrates by combining active substances with inert organic solvents and/or capillary active substances, which concentrates can be mono- or poly-phase, and then working these up with water to ready-for-use emulsions. As capillary active substances (emulsifying agents) can be used cation active substances such as, e.g. quaternary ammonium salts, anion active substances such as salts of aliphatic long chain sulphuric acid monoesters, long chain alkoxyacetic acids and aliphatic-aromatic sulphonic acids, and non-ionogenic capillary active substances, e.g. polyethyleneglycol ethers of fatty alcohols or of dialkylphenols and polycondensation products of ethylene oxide. Cyclic hydrocarbons such as benzene, toluene, xylene, ketones, alcohols and other solvents such as ethyl acetate, dioxan, acetone glycerine or diacetone alcohol are suitable for example as solvents in the production of emulsions concentrates.

Suspensions can be obtained by direct suspension of solid, moist active ingredients in water which possibly contains a capillary active substance, or they are obtained by suspending in water wettable powders which are produced by combining solid active ingredients with capillary active substances or by combining solid or liquid active ingredients with solid pulverulent carriers and capillary active substances.

As solutions of the active substances according to the invention, in particular those in low boiling halogen-hydrocarbons which themselves have a nematocidal action are used, for example in 1,2-dibromo-3-chloropropane, in dichlorobutene or in mixtures of dichloropropane and dichloropropene, the transitory nematocidal action of which is supplemented in a valuable manner by the long-lasting action of the active substances according to the invention.

In the amounts necessary in practice, the active substances according to the invention have not a phytotoxic action so that there is no question of injurious influence on plant growth. If desired, however, the biological activity of the agents according to the invention can be supplemented by the addition of fungicidal, herbicidal or insecticidal or other nematocidal active substances.

In the following will be found first examples of the test methods used to determine the activity of the active substances and then a number of examples of typical forms of application are given.

*Example 1*

The active substances to be tested are worked up into emulsifiable solutions with polyhydroxyethylene sorbitan monooleate and acetone. 0.5 ml. thereof are emulsified with 1.5 ml. of water and the emulsions are applied to 100 ml. of earth which has been infested with *Meloidogyne arenaria*. The earth so treated is put into glass vessels which are then closed and left for 10 days at room temperature. At the end of this time the number of living nematodes is determined by the funnel method. N-methyl-dithiocarbamic acid-benzyl ester and N-methyl-dithiocarbamic acid-4-nitrobenzyl ester effected a complete kill with only 62 p.p.m. of active substance.

*Example 2*

The amount of N-methyl-dithiocarbamic acid-4-nitrobenzyl ester necessary to attain the desired concentration is thoroughly mixed with 20 ml. of washed, dry sand and the mixture is incorporated into 2 l. of natural earth which has been injected with *Meloidogyne arenaria*. After leaving the earth for 7 days, it is distributed in three plant pots and two young tomato plants are set in each pot. After 9 weeks, the cysts formed on the roots of the plants are counted and the weight of the rhizome is determined. The results are given below:

|  | Agent per pot containing 2 plants | | | |
|---|---|---|---|---|
|  | N-Methyl-dithiocarbamic acid-4-nitrobenzyl ester, p.p.m. | | | control |
|  | 125 | 250 | 500 |  |
| No. of cysts on roots | 19 | 0 | 0 | 237 |
| No. of cysts per lg. of root | 3 | 0 | 0 | 35 |

*Example 3*

20 parts of active ingredient, for example N-methyl-dithiocarbamic acid-benzyl ester and 80 parts of talcum are milled to the greatest degree of fineness in a ball mill. The mixture obtained serves as a dust.

*Example 4*

20 parts of active ingredient, for example N-methyl-dithio-carbamic acid-2-nitrobenzyl ester, are dissolved in a mixture of 48 parts of diacetone alcohol, 16 parts of xylene and 16 parts of an anhydrous, high molecular condensation product of ethylene oxide with higher fatty acids. This concentrate can be diluted with water to form emulsions of any concentration desired.

*Example 5*

80 parts of active ingredient, for example, N-methyl-dithio-carbamic acid-4-methylbenzyl ester, are mixed with 2–4 parts of a wetting agent, e.g. a sulphuric acid ester of an alkyl polyglycol ether, 1–3 parts of a protective colloid, e.g. sulphite waste liquor and 15 parts of an inert, solid carrier such as, e.g. kaolin, bentonite, chalk or kieselguhr and the mixture is then finely milled in a suitable mill. The wettable powder obtained can be stirred with water and produces very stable suspensions.

*Example 6*

5 parts by weight of active ingredient, e.g. N-methyl-dithiocarbamic acid-4-chlorobenzyl ester are mixed and milled with 95 parts by weight of calcium carbonate (=ground limestone). The product can be used as a sprinkling agent.

*Example 7*

5 parts by weight of active ingredient, e.g. N-methyl-dithiocarbamic acid benzyl ester are mixed with 95 parts of a pulverulent carrier, e.g. sand or calcium carbonate and the mixture is moistened with 1–5 parts by weight of water or isopropanol. The mixture is then granulated. Before granulating, a great excess, e.g. 100–900 parts of a possibly water soluble synthetic fertiliser such as, e.g. ammonium sulphate, can be mixed with the above mixture or with one containing more active ingredient, e.g. containing 10 parts of active ingredient and 90 parts of calcium carbonate.

*Example 8*

A solution which can be emulsified in water is obtained by mixing 50 parts of N-methyl dithiocarbamic acid benzyl ester, 45 parts of xylene, 2.5 parts of an ethylene oxide condensation product of an alkyl phenol and 2.5 parts of a mixture of the sodium salts of dodecyloxyethoxyethyl sulphuric acid and dodecyloxyethoxyethyl sulphuric acid.

What I claim is:
1. The method of controlling plant-parasitic nematodes in the soil which comprises applying to a soil serving for the cultivation of plants, and in an amount and concentration sufficient to control nematodes and within the range of about 50 to 250 kg. per hectare of active nematocidal agent and substantially uniformly throughout a layer of soil about 15 to 25 cm. deep, an agricultural composition comprising as said active nematocidal agent a substituted dithiocarbamic acid benzyl ester of the formula

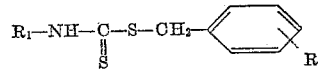

wherein
R represents a member selected from the group consisting of hydrogen, the chlorine atom, the methyl radical and the nitro group, and
$R_1$ represents a member selected from the group consisting of the methyl and the ethyl radical,
and an agricultural carrier.

2. The method of controlling plant-parasitic nematodes in the soil which comprises applying to a soil serving for the cultivation of plants, and in an amount sufficient to control nematodes and within the range of about 50 to 250 kg. per hectare and substantially uniformly throughout a layer of soil about 15 to 25 cm. deep, a substituted dithiocarbamic acid benzyl ester corresponding to the formula

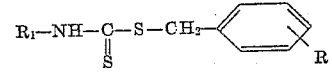

wherein
R represents a member selected from the group consisting of hydrogen, the chlorine atom, the methyl radical and the nitro group, and $R_1$ represents a member selected from the group consisting of the methyl and the ethyl radical.

3. The method conforming to claim 2, in which the active ester used is N-methyl dithiocarbamic acid benzyl ester.

4. The method conforming to claim 2, in which the active ester used is N-methyl dithiocarbamic acid-4-nitrobenzyl ester.

5. The method conforming to claim 2, in which the active ester used is N-methyl dithiocarbamic acid-2-nitrobenzyl ester.

6. The method conforming to claim 2, in which the active ester used is N-methyl dithiocarbamic acid-4-methylbenzyl ester.

7. The method conforming to claim 2, in which the active ester used is N-methyl dithiocarbamic acid-4-chlorobenzyl ester.

References Cited in the file of this patent

UNITED STATES PATENTS

| | | |
|---|---|---|
| 2,677,698 | Deutschman | May 4, 1954 |
| 2,943,972 | Kerk | July 5, 1960 |
| 2,951,786 | Pullen | Sept. 6, 1960 |

FOREIGN PATENTS

| | | |
|---|---|---|
| 228,387 | Switzerland | Aug. 31, 1943 |
| 742,185 | Germany | Oct. 14, 1943 |
| 233,721 | Switzerland | Aug. 15, 1944 |